United States Patent [19]
Fujiu et al.

[11] Patent Number: 5,452,917
[45] Date of Patent: Sep. 26, 1995

[54] APPARATUS FOR SUPPORTING A TILTABLE STEERING SHAFT

[75] Inventors: Isao Fujiu; Masayoshi Yamada; Mitsuo Yabutsuka, all of Kiryu, Japan

[73] Assignee: Kabushiki Kaisha Yamada Seisakusho, Gunma, Japan

[21] Appl. No.: 360,876

[22] Filed: Dec. 21, 1994

[30] Foreign Application Priority Data

Dec. 24, 1993 [JP] Japan .................................. 5-345963

[51] Int. Cl.$^6$ ........................................... B62D 1/11
[52] U.S. Cl. ........................ 280/777; 74/492; 188/371
[58] Field of Search ........................ 280/777, 779, 280/775; 180/232; 74/492, 493; 188/371, 377

[56] References Cited

U.S. PATENT DOCUMENTS

| | | | |
|---|---|---|---|
| 3,942,391 | 3/1976 | Barth et al. | 280/777 X |
| 5,024,118 | 6/1991 | Kholifa et al. | 280/777 X |
| 5,052,240 | 10/1991 | Miyoshi et al. | 280/777 X |
| 5,056,818 | 10/1991 | Sadakata | 280/777 |
| 5,081,879 | 1/1992 | Pidgeon | 74/492 |
| 5,286,056 | 2/1994 | Speich | 280/777 |

FOREIGN PATENT DOCUMENTS

| | | | |
|---|---|---|---|
| 64-42970 | 3/1989 | Japan . | |
| 3284476 | 12/1991 | Japan | 280/777 |
| 4-43420 | 10/1992 | Japan . | |
| 4-50218 | 11/1992 | Japan . | |
| 5213205 | 8/1993 | Japan | 280/777 |

Primary Examiner—Eric D. Culbreth
Assistant Examiner—Christopher Ellis
Attorney, Agent, or Firm—Lowe, Price, LeBlanc & Becker

[57] ABSTRACT

An apparatus for supporting a tiltable steering shaft includes: a fixed bracket A having a pair of fixing/supporting members $A_1$ which are connected to each other by means of a U-shaped connecting member 5 so as to be arranged laterally symmetrically at an appropriate distance therebetween; a movable bracket B having a pair of side plates 6 which are arranged in face-to-face relation to each other at an appropriate distance therebetween, the side plates 6 of the movable bracket B being secured to a steering column 2, the movable bracket B being disposed between the fixing/supporting members A1 of the fixed bracket A in such a manner as to be capable of being raised or lowered and of being secured at an appropriate position by means of a tilt-adjusting bar 9. A pair of abutting ends 6a of the side plates 6 of the movable bracket B are capable of abutting against a pair of abutted ends 5a of the connecting member 5 only when an impact load has occurred.

6 Claims, 8 Drawing Sheets

APPARATUS FOR SUPPORTING A TILTABLE STEERING SHAFT

BACKGROUND OF THE INVENTION

1. Field of the Invention

The present invention relates to an apparatus for supporting a tiltable steering shaft which, with a very simple structure, is capable of demonstrating impact absorbing action speedily and reliably with respect to an impact occurring during a collision.

2. Description of the Related Art

Various apparatuses for supporting tiltable steering shafts have been proposed in which, in the event that an impact load has acted upon a steering wheel by the driver during a collision of a vehicle, a mounting portion of a fixed bracket is disengaged from a vehicle body-side mounting portion, so as to ensure the driver's safety. For example, in an apparatus disclosed in Japanese Utility Model Application Laid-Open No. 64-42970, a stopper member is formed on the fixed bracket so as to abut against the steering column for restricting the rotation of the fixed bracket when the driver has hit against the steering wheel during a collision of a vehicle, and an impact load has acted upon the steering column.

Among such stopper members, there is one which is formed by also serving as a connecting member for connecting a right side plate and a left side plate of the fixed bracket, and there is another in which both side end portions of an upper mounting portion of the fixed bracket are bent in such a manner as to oppose each other, as shown in Japanese Utility Model Application Publication No. 4-50218.

In addition, as disclosed in Japanese Utility Model Application Publication No. 4-43420, there is an apparatus in which a stopper member, which abuts against an end of a fixed bracket when an impact load has acted upon the steering column, is formed on a movable bracket, the stopper member being formed integrally in such a manner as to project laterally from both sides at one end of the movable bracket.

In these apparatuses, the stopper members are not newly attached as separate parts, but they are each formed by bending a component part of the apparatus or by making such a component part serve a double purpose. Hence, since the number of component parts used does not increase, and the structures are relatively simple, the apparatuses can be made compact.

In the above-described stopper members, the rotation of the fixed bracket due to the angular moment acting in the clockwise direction about a tilting bolt when the impact load acts is prevented as the stopper member comes into contact with the steering column or the movable bracket. With the apparatuses for supporting a tiltable steering shaft in the above-described conventional examples, in addition to the rotation of the fixed bracket, bending moment acts about attaching bolts in the mounting portion of the fixed bracket, and a portion of the bracket close to the attaching bolts becomes deformed, thereby possibly making it difficult for the bracket to be disengaged from the mounting portion of the vehicle body.

Among the above-described conventional examples, the stopper member, which also serves as the connecting member and is adapted to abut against the steering column and is disposed on the mounting portion of the fixed bracket as in Japanese Utility Model Application Laid-Open No. 64-42970, is formed of a thin plate, and its end face is set as an abutment surface against the steering column so that its cross section taken along the abutting direction is made large. Hence, the rigidity in the abutting direction only is secured, and the stopper member essentially serves as a connecting member for connecting the left and right side plates.

Such a stopper member is provided on the front side (steering wheel side) of the mounting portion of the fixed bracket and in the vicinity of the mounting portion of the bracket. When the aforementioned bending moment acts, a substantially large force is received in the vicinity of the mounting portion of the fixed bracket due to the bending moment in the mounting portion of the fixed bracket. Thus, there is a possibility that the stopper member becomes deformed, so that the deformation of the mounting portion of the fixed bracket cannot be prevented, thereby making it impossible for the bracket to be disengaged smoothly from the mounting portion of the vehicle body.

Hence, although the above-described stopper member also serves as the connecting member for connecting the left and right side plates, in the final analysis the stopper member only restricts the rotation of the fixed bracket due to its abutment against the steering column, and cannot prevent the deformation due to the bending moment applied to the mounting portion of the fixed bracket.

In addition, with the structure for restricting the rotation by abutment between the steering column and the stopper member provided on the fixed bracket as in the cases of Japanese Utility Model Application Laid-Open No. 64-42970 and in Japanese Utility Model Application Publication No. 4-50218, the distance between the steering column and the stopper member formed on the fixed bracket varies depending on the vertically adjusted position of the tiltable steering column. Hence, there is a problem in that it is difficult to obtain stable abutment by setting the timing of abutment against the steering column.

The above-described apparatus disclosed in Japanese Utility Model Application Publication No. 4-43420 has a U-shaped cross section in which the mounting portion side of the fixed bracket is open, and lower portions of the side plates of the bracket are connected integrally. Since the flexural rigidity of the mounting portion of the fixed bracket is not necessarily secured, in the event that bending moment has acted about the attaching bolts, it is impossible to sufficiently prevent the deformation of the mounting portion of the bracket close to the attaching bolts, thereby possibly making it difficult for the bracket from being disengaged smoothly from the mounting portion of the vehicle body.

In addition, if the stopper member is formed integrally at one end of the movable bracket as described above, since the tilting bolt where the center of angular moment is formed is located in the movable bracket, and the stopper member is formed at a substantially shortest distance from the tilting bolt with respect to the vertically adjusting position of the steering column, there is the possibility of the amount of rotation of the fixed bracket becomes large until the fixed bracket abuts against the stopper member. As a result, there is a problem in that it is difficult to restrict the rotation of the fixed bracket at an appropriate position.

As described above, since the above-described stopper members are not newly attached as separate parts, but they are formed at limited portions of the component parts by serving a double purpose, it becomes difficult for such a stopper member to cause the fixed bracket to be disengaged smoothly from the mounting portion of the vehicle body while restricting the rotation of the fixed bracket by the position of the stopper member during the occurrence of an impact.

SUMMARY OF THE INVENTION

Accordingly, an object of the present invention is to provide an apparatus for supporting a tiltable steering shaft which, with a very simple structure, is capable of allowing the fixed bracket to be disengaged smoothly during the occurrence of an impact, thereby overcoming the above-described problems of the conventional art.

To this end, in accordance with one aspect of the present invention, there is provided an apparatus for supporting a tiltable steering shaft, comprising: a fixed bracket having a pair of fixing/supporting members which are connected to each other by means of a U-shaped connecting member so as to be arranged laterally symmetrically at an appropriate distance therebetween; a movable bracket having a pair of side plates which are arranged in face-to-face relation to each other at an appropriate distance therebetween, the side plates of the movable bracket being secured to a steering column, the movable bracket being disposed between the fixing/supporting members of the fixed bracket in such a manner as to be capable of being raised or lowered and of being secured at an appropriate position by means of a tilt-adjusting bar, wherein a pair of abutting ends of the side plates of the movable bracket are capable of abutting against a pair of abutted ends of the connecting member only when an impact load has occurred. Accordingly, the apparatus can be constructed with a very simple structure, and the impact load can be absorbed reliably. Specifically, the side plates of the fixed bracket are made to be capable of abutting against the connecting member for laterally symmetrically connecting the fixing/supporting members constituting the fixed bracket only then the impact load has occurred. At the time of abutment, the abutting ends of the side plates are made to abut against the abutted ends of the connecting member, and the abutting ends and the abutted ends are not newly formed, but the connecting member constituting the fixed bracket and the side plates constituting the movable bracket can be used in their original states. Accordingly, the installation of new component parts, processing, or the like is required. Furthermore, in the operation due to the impact load, the side plates of the movable bracket merely collide against the connecting member of the fixed bracket, and the operation is effected reliably.

In accordance with another aspect of the present invention, there is provided a supporting apparatus in which a movable bracket connected to a steering column is connected to a fixed bracket, and the fixed bracket is fixed to a predetermined position within a vehicle compartment via an energy absorbing member, so as to support stable movement of the fixed bracket along the energy absorbing member, the supporting apparatus comprising: a U-shaped connecting member constituting a part of the fixed bracket and arranged along an upper portion of an outer periphery of the steering column, steering wheel-side ends of side portions of the connecting member being formed as abutted ends; a pair of supporting members constituting parts of the fixed bracket, the supporting members having side plates which are respectively affixed to opposite sides of the connecting member and extend substantially vertically; a pair of side plates constituting parts of the movable bracket and interposed between the pair of supporting members in such a manner that a position of the movable bracket is adjustable, ends of the side plates of the movable bracket located away from the steering wheel being formed as abutting ends, wherein the abutting ends are adapted to abut against the abutted ends in a direction in which a bending force acting in the steering column is offset, when an impact load is applied from the steering wheel to the steering column.

The above and other objects, features and advantages of the present invention will become more apparent from the following detailed description of the invention when read in conjunction with the accompanying drawings.

DESCRIPTION OF THE PREFERRED EMBODIMENT

Figure 1:
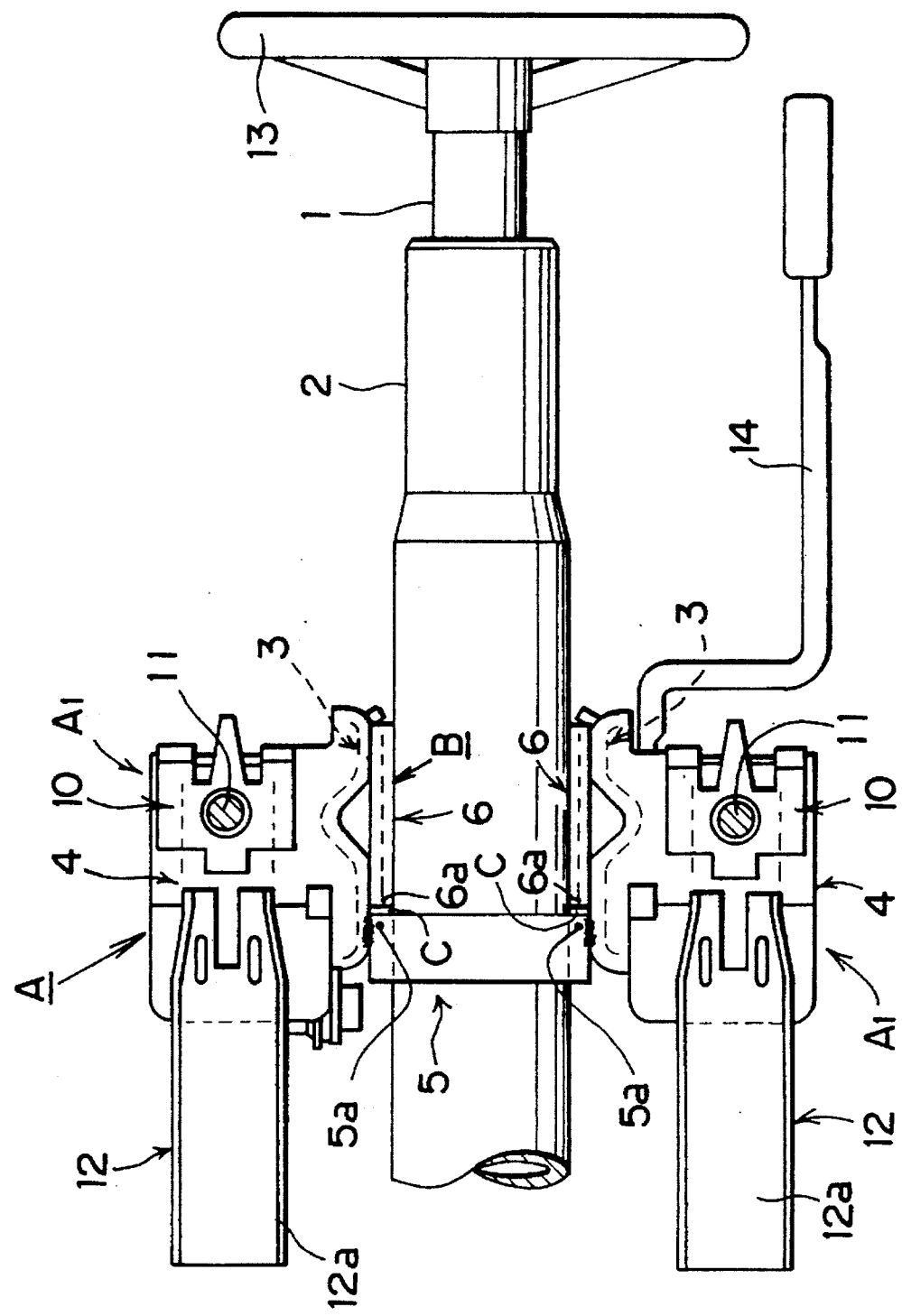
FIG. 1 is a plan view of an apparatus for supporting a tiltable steering shaft in accordance with an embodiment of the present invention.
Figure 2:
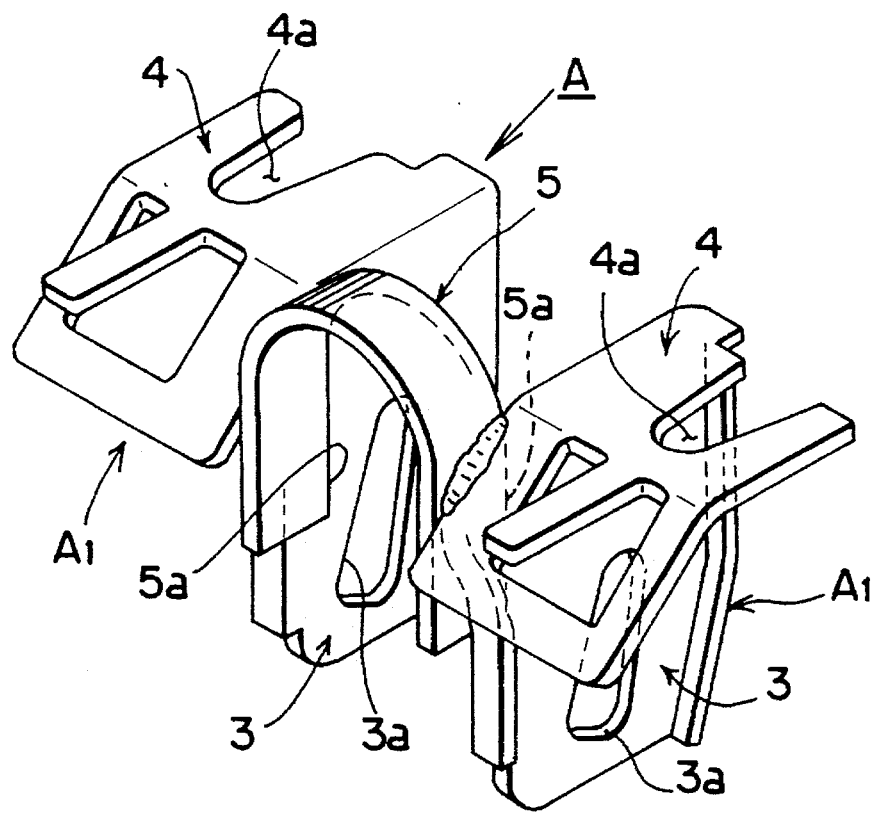
FIG. 2 is a perspective view of a fixed bracket and a movable bracket in accordance with the embodiment.
Figure 2:
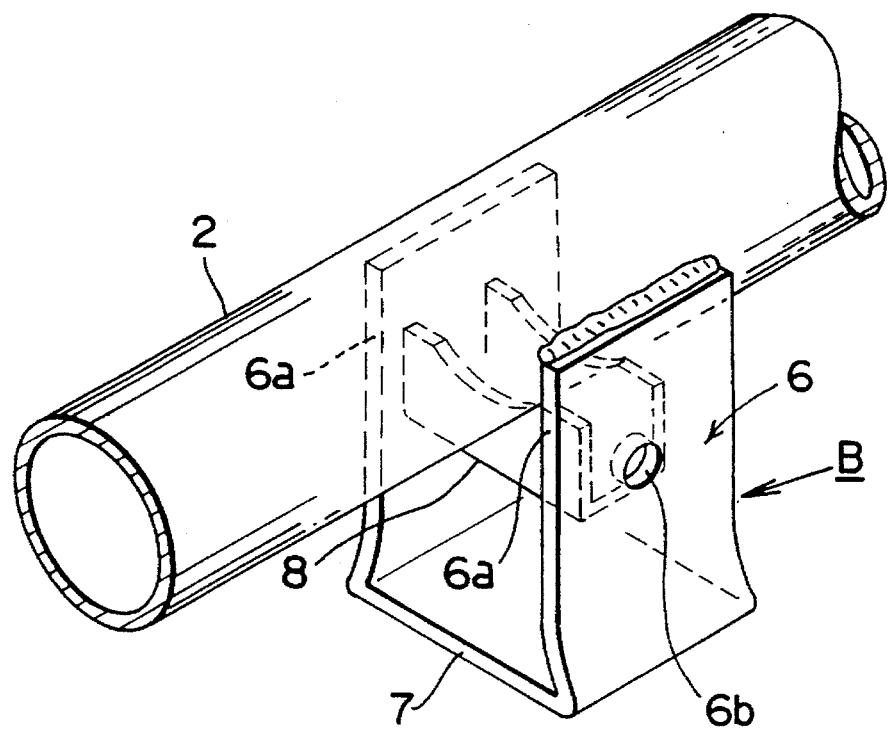
Figure 3:
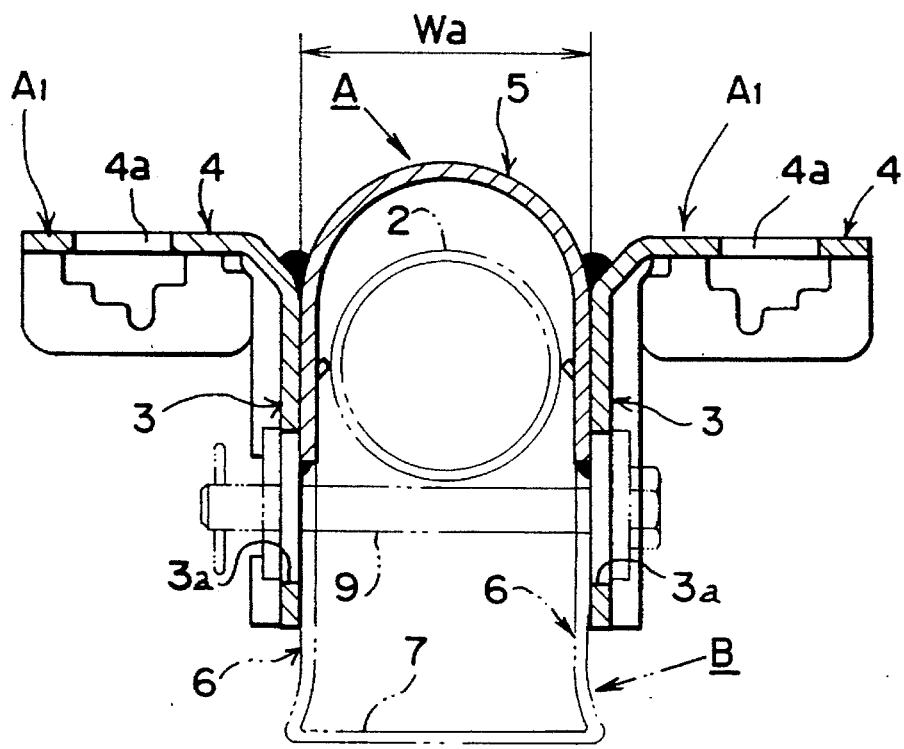
FIG. 3 is a front elevational view, taken from the steering wheel side, of the fixed bracket and the movable bracket.
Figure 3:
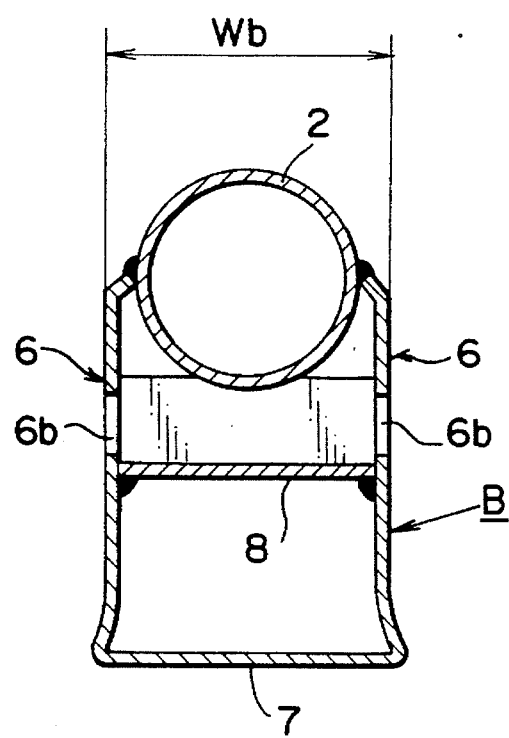
Figure 4:
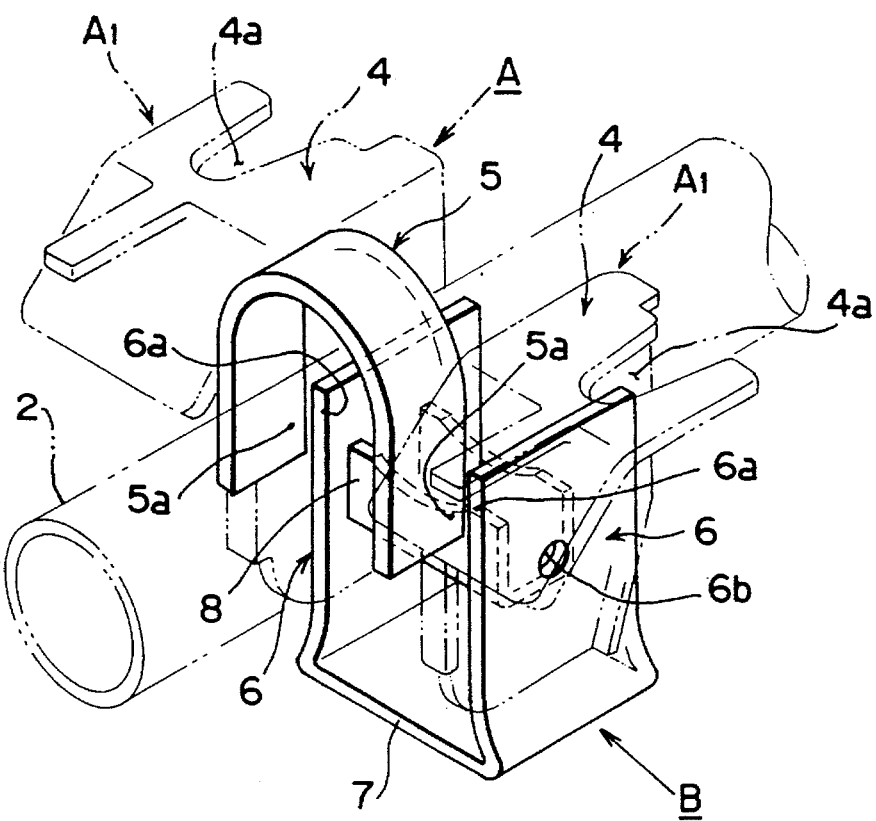
FIG. 4 is a perspective view of a state in which the fixed bracket and the movable bracket are combined.
Figure 5:
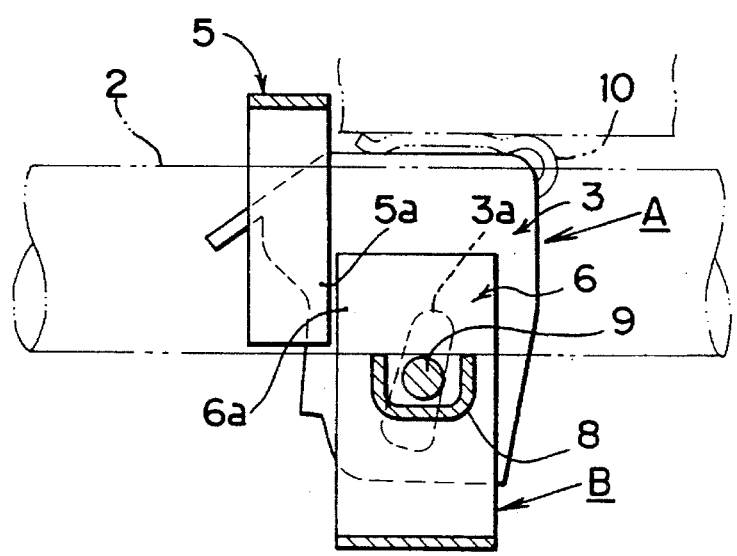
FIG. 5 is a side elevational view of the state in which the fixed bracket and the movable bracket are combined.

Hereafter, a description will be given of an embodiment of the present invention with reference to the accompanying drawings. As shown in FIG. 1, a steering column 2 in which a steering shaft 1 is fitted is supported by the vehicle body by means of a fixed bracket A and a movable bracket B. As shown in FIGS. 2, 3 and the like, the fixed bracket A has a pair of fixing/supporting members $A_1$ connected to each other by means of a connecting member 5 so as to be arranged laterally symmetrically.

Figure 12:
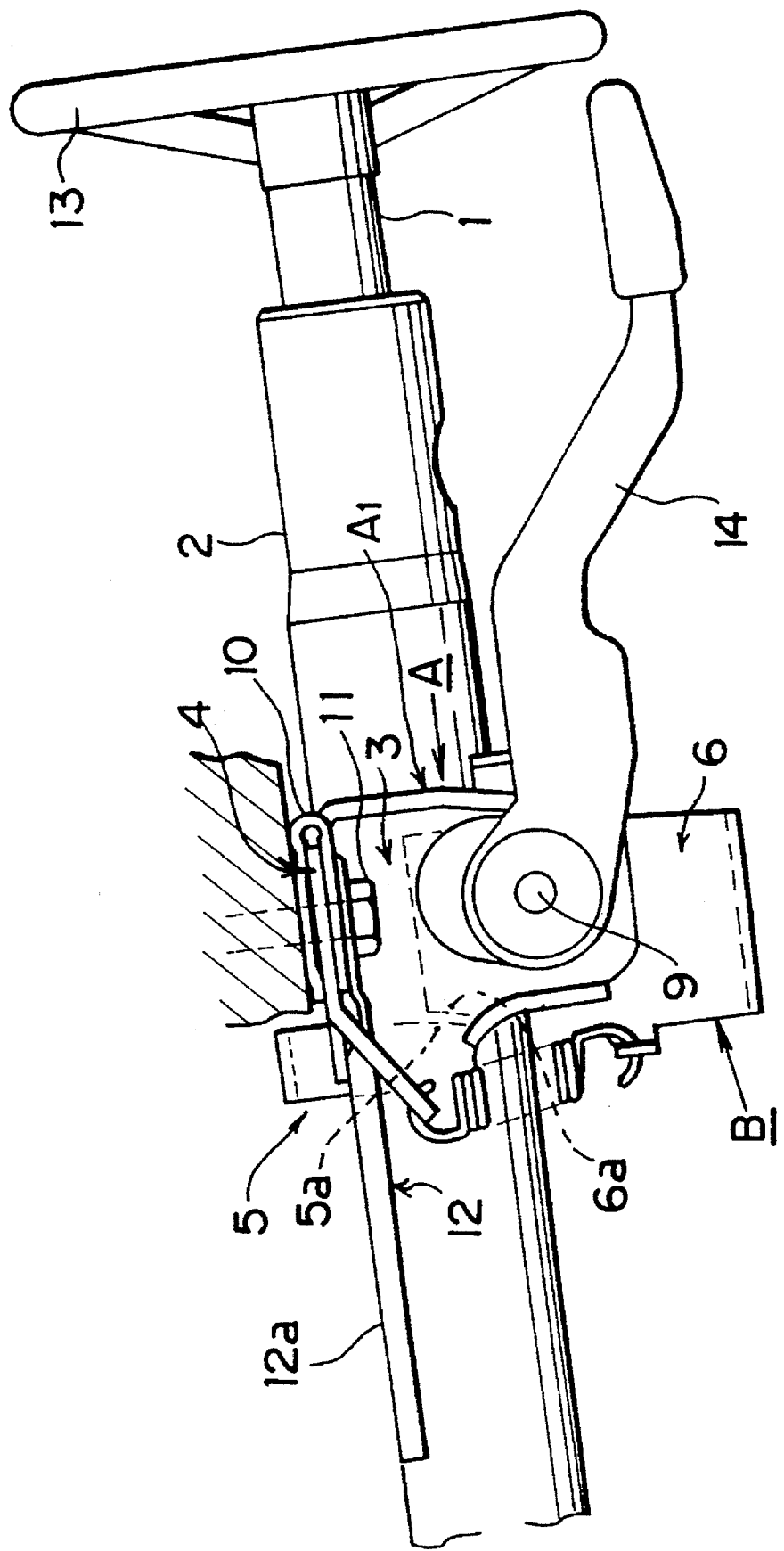
FIG. 12 is a side elevational view of the apparatus for supporting a tiltable steering shaft in accordance with the present invention.

As shown in FIG. 2, each fixing/supporting member $A_1$ is arranged such that a top fixing plate 4 is formed on top of a vertical supporting side plate 3 in such a manner as to extend horizontally in a direction away from the connecting member 5. Each top fixing plate 4 is affixed to a frame member or the like of the chassis of a vehicle at a predetermined position within the vehicle compartment by means of a sliding plate 10 and a fitting 11 such as a bolt, as shown in FIG. 12. The movable bracket B is accommodated between the two opposing supporting side plates 3 of the fixing/supporting members $A_1$ of the fixed bracket A, as shown in FIGS. 1, 3 and the like.

Tilt-adjusting elongated holes 3a are respectively formed in the supporting side plates 3 of the fixing/supporting members $A_1$, while connecting holes 6b are respectively formed in a pair of side plates 6 of the movable bracket B. In the state in which the fixed bracket A is accommodated in the movable bracket B, and a tilt-adjusting bar 9 of a tightening-bolt type is passed through the tilt-adjusting elongated holes 3a and the connecting holes 6b, the movable bracket B is capable of being raised or lowered, and fixed to the fixed bracket A at an appropriate position by tightening the tilt-adjusting bar 9. Furthermore, a tilt-adjusting lever 14 is mounted on an axial end of the tilt-adjusting bar 9 (see FIG. 1).

The side plates 6 on both sides of the movable bracket B are formed integrally with a bottom 7, and top portions of the side plates 6 are symmetrically secured to diametrically opposite sides of the steering column 2 by means of welding. A spacer 8 is provided between the side plates 6 so as to maintain the interval between the side plates 6.

Front-side ends of the side plates 6 of the movable bracket B are formed as abutting ends 6a, while rear-side ends of side portions of the connecting member 5 of the fixed bracket A are formed as abutted ends 5a (see FIGS. 1, 6, 7, and 12). The arrangement provided is such that in the event that a driver has hit against a steering wheel 13 due to an impact occurring during the collision of the vehicle, the movable bracket B is adapted to move forward along the axial direction of the steering column 2, and the abutting ends 6a of the movable bracket B abut against the abutted ends 5a of the fixed bracket A. For this reason, an inside interval Wa between the opposing supporting side plates 3 of the fixed bracket A and an outside interval Wb of the opposing side plates 6 of the movable bracket B are set to be substantially identical (see FIG. 3).

Here, the front-side ends of the side plates 6 in the axial direction of the steering column 2 refer to portions which are located on an unillustrated front-wheel side of the vehicle, while the rear-side ends of the connecting member 5 in the axial direction of the steering column 2 are located on the steering wheel 13 side, as shown in FIGS. 1, 6, 7, 12, and the like.

Figure 6:
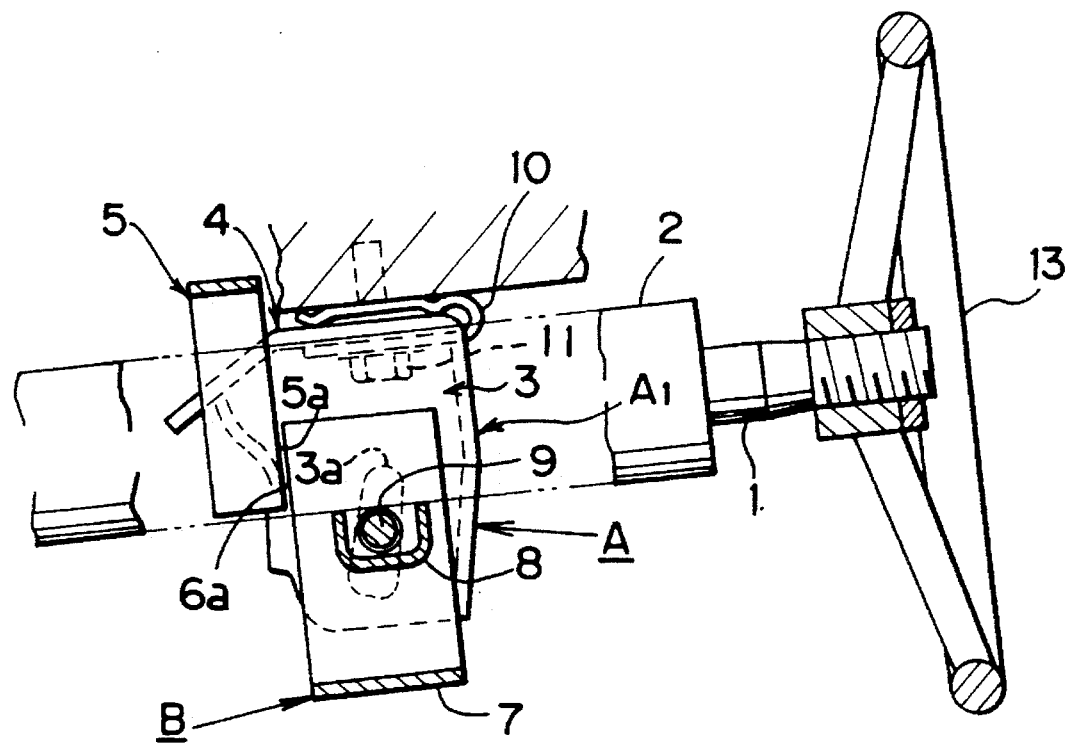
FIG. 6 is a vertical cross-sectional view illustrating a state prior to the application of an impact load upon a steering system.
Figure 7:
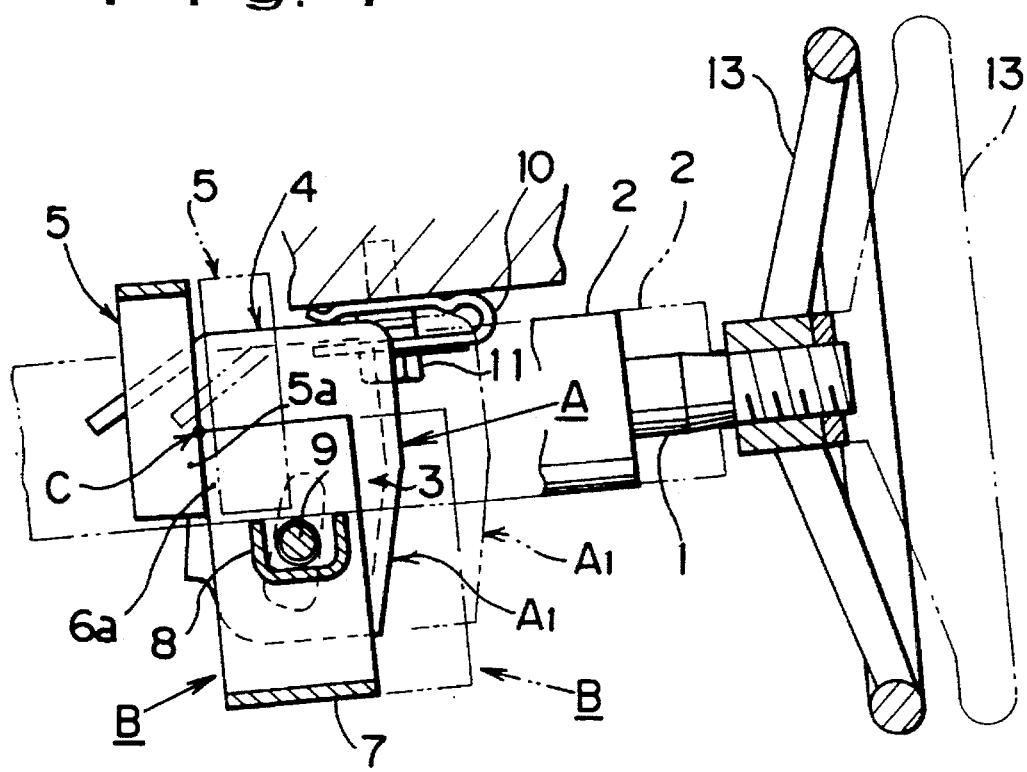
FIG. 7 is a vertical cross-sectional view illustrating a state the movable bracket has abutted against the fixed bracket.
Figure 8:
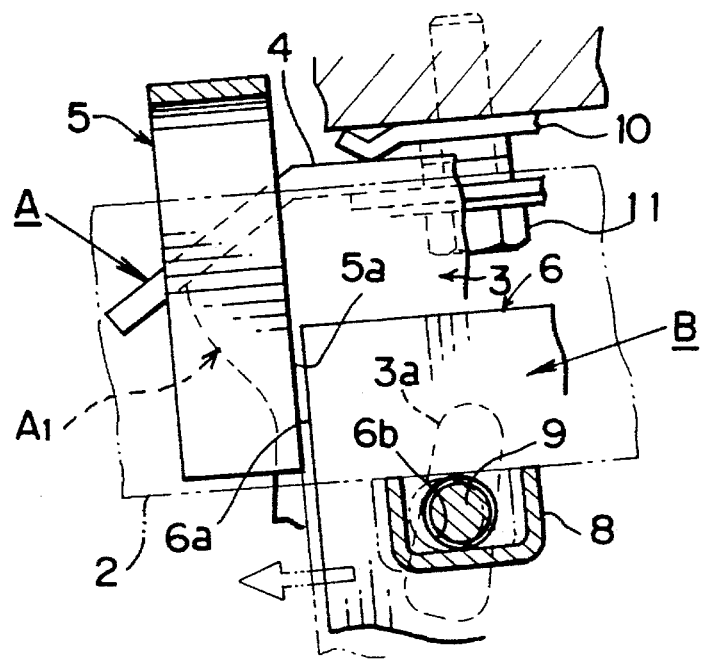
FIG. 8 is an enlarged view of an essential portion in the state prior to the application of the impact load upon the steering system.

As shown in FIG. 6, at normal times, i.e., when no impact is produced, a slight gap is formed between the abutting ends 6a of the side plates 6 and the abutted ends 5a of the connecting member 5. In addition, an abutment portion C between the abutting ends 6a and the abutted ends 5a should preferably be located above the mounting position of the tilt-adjusting bar 9 for adjusting the tilt of the movable bracket B with respect to the fixed bracket A.

Generally, due to reaction occurring during the collision of the vehicle, the steering column 2 moves toward the axially forward side (the front wheel side) together with the movable bracket B and the tilt-adjusting bar 9 via the steering wheel 13. For this reason, an impact load momentarily acts upon the fixed bracket A and angular moments acts thereupon, with the result that the fixed bracket A becomes difficult to be removed from the sliding plate 10.

However, as described before, since the position of the abutment portion C is located above the mounting position of the tilt-adjusting bar 9, the abutting ends 6a move toward the axially forward side (the front wheel side) of the steering column 2, and abut against the abutted ends 5a at the abutment portion C, thereby exerting a pressing force P.

The pressing force P acts in a direction opposite to the rotational direction of angular moment M occurring momentarily due to the impact load acting upon the fixed bracket A via the tilt-adjusting bar 9, and the pressing force P offsets the angular moment M. Consequently, the fixed bracket A is capable of moving substantially along the axial direction of the steering column 2, and can be disengaged very smoothly from the sliding plate 10.

Figure 10:
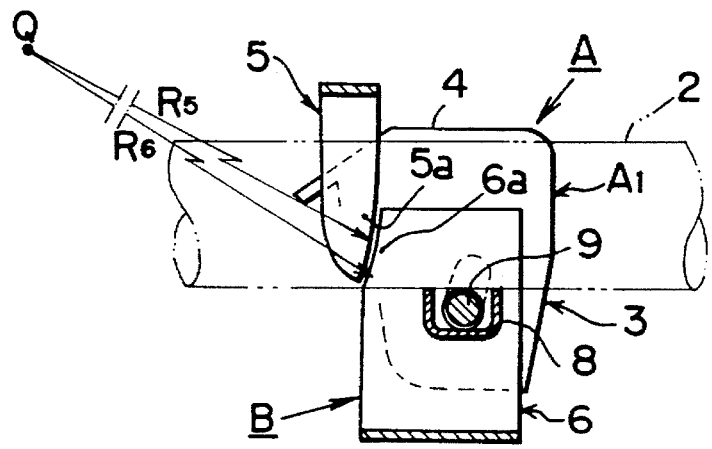
FIG. 10 is a schematic diagram of a modification of abutting ends and abutted ends in which they are made arcuate about a swinging center.
Figure 11:
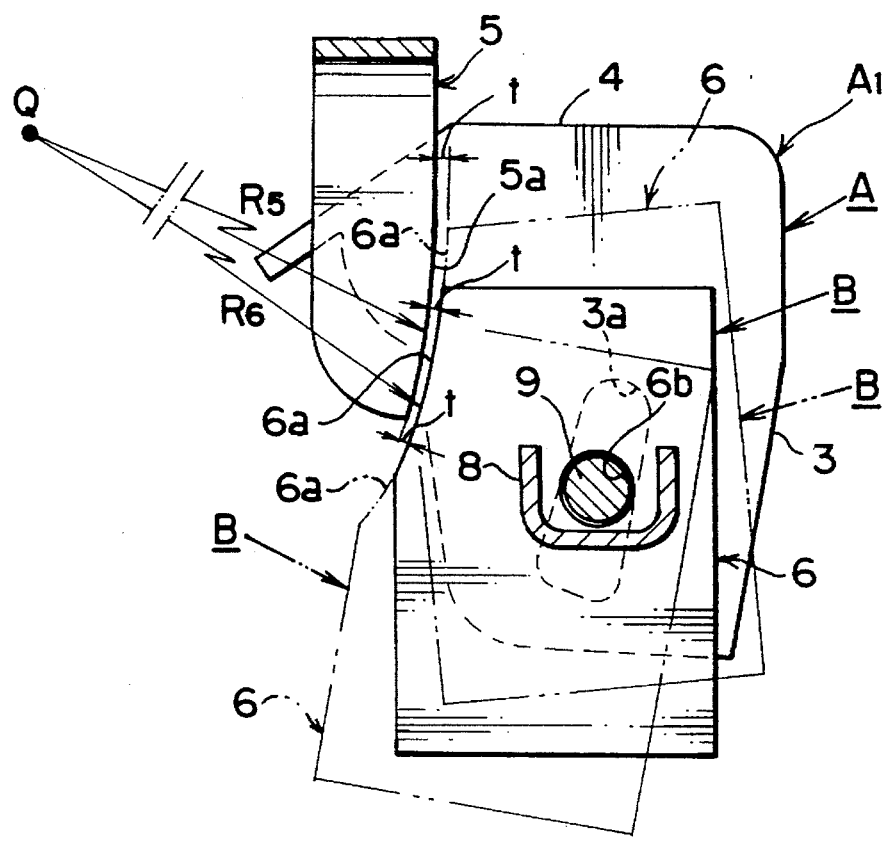
FIG. 11 is an enlarged view of the essential portion in accordance with the modification in which the abutting ends and the abutted ends are made arcuate.

As shown in FIGS. 10 and 11, a swinging center Q is present in the steering column 2 during tilt adjustment, and the movable bracket B is arranged to move substantially vertically about the swinging center Q. Specifically, FIGS. 10 and 11 show a modification of each abutted end 5a of the connecting member 5 and each abutting end 6a of the side plate 6, in which their shapes are formed substantially along an arcuate locus when the movable bracket B is swung about the swinging center Q. As shown in the drawings, the radius of curvature of the abutted end 5a from the swinging center Q is set to be $R_5$, and the radius of curvature of the abutting end 6a from the swinging center Q is set to be $R_6$.

As described above, as the abutted ends 5a and the abutting ends 6a are formed substantially arcuately about the swinging center Q, even if the movable bracket B is moved substantially vertically with respect to the fixed bracket A during tilt adjustment, a gap t between the abutting ends 6a of the movable bracket B and the abutted ends 5a of the fixed bracket A can be constantly fixed, as shown in FIG. 11. Incidentally, the shapes of each abutted end 5a and each abutting end 6a are not particularly confined to the arcuate shapes, and linear shapes closely resembling the arcuate shapes may also be used.

As described above, the fixed bracket A is secured at a predetermined position on the vehicle body, and the pair of fixing/supporting members $A_1$ of the fixed bracket A are slidably clamped by the sliding plate 10, and when the steering column 2 has moved in the axial direction via the steering wheel 13 during the occurrence of an impact, the fixed bracket A is adapted to be easily disengaged from the sliding plate 10 in the forward direction of the vehicle body.

A sliding notch 4a is formed in each of the top fixing plates 4 of the fixing/supporting members $A_1$, and the sliding plate 10 is secured to the vehicle body through the sliding notches 4a by means of the fittings 11 such as bolts, as described above. Furthermore, the fixed bracket A is provided with a pair of energy absorbing members 12, as shown in FIGS. 1 and 12. A pair of crushable ribs 12a are formed on each of the energy absorbing members 12. The arrangement provided is such that the fixed bracket A is moved in the forward direction of the vehicle body while the crushable ribs 12a are being crushed by the fixed bracket A.

In the present invention, the arrangement provided is such that the apparatus for supporting a tiltable steering shaft comprises: the fixed bracket A having the pair of fixing/supporting members $A_1$ which are connected to each other by means of the U-shaped connecting member 5 so as to be arranged laterally symmetrically at an appropriate distance therebetween; the movable bracket B having the pair of side plates 6 which are arranged in face-to-face relation to each other at an appropriate distance therebetween, the side plates 6 of the movable bracket B being secured to the steering column 2, the movable bracket B being disposed between the fixing/supporting members $A_1$ of the fixed bracket A in such a manner as to be capable of being raised or lowered and of being secured at an appropriate position by means of the tilt-adjusting bar 9, wherein the pair of abutting ends 6a of the side plates 6 of the movable bracket B are capable of abutting against the pair of abutted ends 5a of the connecting member 5 only when an impact load has occurred. Accordingly, first of all, the apparatus can be constructed with a very simple structure, and, secondly, the impact load can be absorbed reliably.

To summarize the advantages of the above-described arrangement, the side plates 6 of the fixed bracket A are made to be capable of abutting against the connecting member 5 for laterally symmetrically connecting the fixing/supporting members $A_1$ constituting the fixed bracket A only when the impact load has occurred. At the time of abutment, the abutting ends 6a of the side plates 6 are made to abut against the abutted ends 5a of the connecting member 5, and the abutting ends 6a and the abutted ends 5a are not newly formed, but the connecting member 5 constituting the fixed bracket A and the side plates 6 constituting the movable bracket B can be used in their original states. Accordingly, the installation of new component parts, processing, or the like is required. Furthermore, in the operation due to the impact load, the side plates 6 of the movable bracket B merely collide against the connecting member 5 of the fixed bracket A, and the operation is effected reliably.

Figure 9:
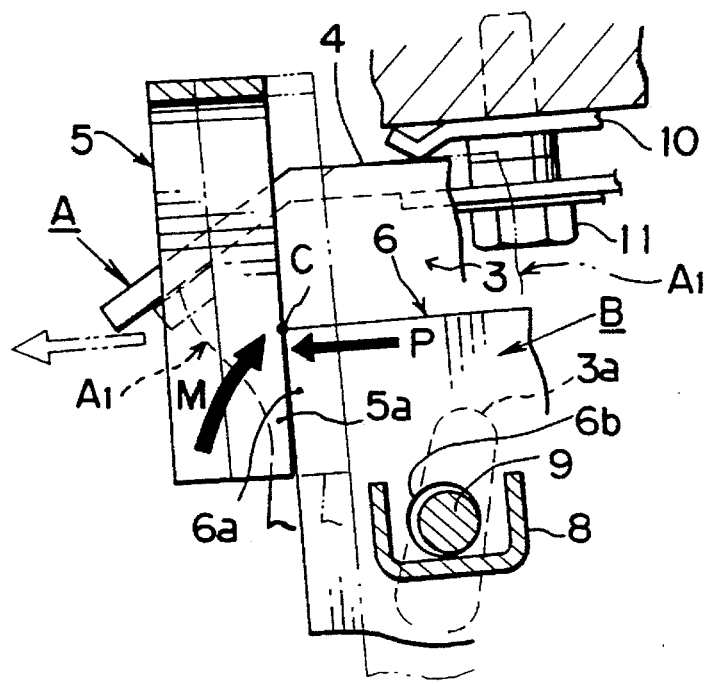
FIG. 9 is an enlarged view of the essential portion in the state in which the movable bracket has abutted against the fixed bracket.

In addition, in accordance with the present invention, the abutment portion C between the abutted ends 5a of the connecting member 5 of the fixed bracket A and the abutting ends 6a of the side plates 6 of the movable bracket B is located above the position of the tilt-adjusting bar 9, as described above. As a result, the fixed bracket A can be disengaged more smoothly from the fixing portion for installation while preventing the deformation of the bracket due to the bending moment applied to the center of the fittings 11 for fixing the fixed bracket A to the fixing portion for installation on the vehicle body, and by preventing the rotation of the fixed bracket A due to the angular moment M applied thereto with the tilt-adjusting bar 9 as the center. Namely, since the abutment portion C between the connecting member 5 of the fixed bracket A and the side plates 6 of the movable bracket B is located above the tilt-adjusting bar 9 at an uppermost position, at the time of abutment, the pressing force P acts from the abutting ends 6a of the side plates in such a manner as to oppose the angular moment M applied to the abutment portion C. Consequently, the rotation of the fixed bracket A can be restricted stably, outstanding safety is ensured, and it is possible to allow the energy absorption to take place stably (see FIG. 9).

Furthermore, in accordance with the present invention, the abutted ends 5a of the connecting member 5 of the fixed bracket A and the abutting ends 6a of the side plates 6 of the movable bracket B are formed in shapes similar to circular arcs with the swinging center Q of the steering column 2 for tilt adjustment as the center, as described above. Accordingly, the interval t between the connecting member 5 and the side plates 6 of the movable bracket B can be made identical in any position in the tilt-adjusting position, and the distance for abutment operation can be set substantially uniform. Hence, the state of the apparatus during abutment can be made stable, and the operation of the energy absorbing mechanism of the tiltable steering shaft can be made smooth and reliable, thereby enhancing the driver's safety.

What is claimed is:

1. An apparatus for supporting a tiltable steering shaft, comprising:
    a fixed bracket having a pair of fixing/supporting members which are connected to each other by means of a U-shaped connecting member so as to be arranged laterally symmetrically at an appropriate distance therebetween;
    a movable bracket having a pair of side plates which are arranged in face-to-face relation to each other at an appropriate distance therebetween, the side plates of said movable bracket being secured to a steering column, said movable bracket being disposed between said fixing/supporting members of said fixed bracket in such a manner as to be capable of being raised or lowered and of being secured at an appropriate position by means of a tilt-adjusting bar,
    wherein a pair of abutting ends of said side plates of said movable bracket are capable of abutting against a pair of abutted ends of said connecting member only when an impact load has occurred.

2. An apparatus for supporting a tiltable steering shaft according to claim 1, wherein an abutment portion between the abutted ends of said connecting member of said fixed bracket and the abutting ends of said side plates of said movable bracket is located above a position of said tilt-adjusting bar.

3. An apparatus for supporting a tiltable steering shaft according to claim 1, wherein the abutted ends of said connecting member of said fixed bracket and the abutting ends of said side plates of said movable bracket are formed in shapes similar to circular arcs with a swinging center of said steering column for tilt adjustment as a center.

4. A supporting apparatus in which a movable bracket connected to a steering column is connected to a fixed bracket, and said fixed bracket is fixed to a predetermined position within a vehicle compartment via an energy absorbing member, so as to support stable movement of said fixed bracket along said energy absorbing member, said supporting apparatus comprising:
    a U-shaped connecting member constituting a part of said fixed bracket and arranged along an upper portion of an outer periphery of said steering column, steering wheel-side ends of side portions of said connecting member being formed as abutted ends;
    a pair of supporting members constituting parts of said fixed bracket, said supporting members having side plates which are respectively affixed to opposite sides of said connecting member and extend substantially vertically;
    a pair of side plates constituting parts of said movable bracket and interposed between said pair of supporting members in such a manner that a position of said movable bracket is adjustable, ends of said side plates of said movable bracket located away from said steering wheel being formed as abutting ends,
    wherein the abutting ends are adapted to abut against the abutted ends in a direction in which a bending force acting in said steering column is offset, when an impact load is applied from said steering wheel to said steering column.

5. A supporting apparatus according to claim 4, wherein said movable bracket is connected to said fixed bracket by means of a tilt-adjusting lever, and an abutment portion between the abutted ends and the abutting ends is set at a position above a position of said tilt-adjusting bar.

6. A supporting apparatus according to claim 5, wherein the abutted ends and the abutting ends are formed in shapes along an arcuate locus with a swinging center of said steering column for tilt adjustment as a center.

* * * * *